United States Patent
Deligeon et al.

(10) Patent No.: US 12,204,647 B2
(45) Date of Patent: Jan. 21, 2025

(54) METHOD FOR SECURING A MOTOR VEHICLE COMPUTER

(71) Applicant: Vitesco Technologies GmbH, Hanover (DE)

(72) Inventors: Vincent Deligeon, Toulouse (FR); Jean-Christophe Seguy, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 717 days.

(21) Appl. No.: 17/152,449

(22) Filed: Jan. 19, 2021

(65) Prior Publication Data

US 2022/0229910 A1 Jul. 21, 2022

(51) Int. Cl.
*G06F 21/57* (2013.01)

(52) U.S. Cl.
CPC .......... *G06F 21/572* (2013.01); *G06F 21/575* (2013.01); *G06F 2221/034* (2013.01)

(58) Field of Classification Search
CPC . G06F 21/572; G06F 21/575; G06F 2221/034
See application file for complete search history.

(56) References Cited

U.S. PATENT DOCUMENTS

| | | | |
|---|---|---|---|
| 2008/0040601 A1 | 2/2008 | McDade, Sr. | |
| 2008/0104310 A1 | 5/2008 | Stern et al. | |
| 2009/0319732 A1* | 12/2009 | Boettcher | G11C 16/16 711/E12.002 |
| 2010/0020601 A1* | 1/2010 | Lee | G11C 11/5628 365/185.33 |
| 2012/0131673 A1* | 5/2012 | Caci | G06F 21/86 726/23 |
| 2012/0317344 A1* | 12/2012 | Sibert | G06F 21/64 711/E12.008 |
| 2014/0025870 A1* | 1/2014 | Lafuente | G06F 8/656 711/103 |
| 2015/0169438 A1* | 6/2015 | Kho | G06F 12/1441 711/156 |
| 2016/0260496 A1* | 9/2016 | Yoon | G11C 16/3445 |
| 2017/0017415 A1* | 1/2017 | Walker | G06F 11/1441 |
| 2019/0251265 A1 | 8/2019 | Ploucha et al. | |
| 2019/0377878 A1* | 12/2019 | Heagney | H04L 9/30 |
| 2021/0049309 A1* | 2/2021 | Su | G06F 3/062 |
| 2021/0056207 A1* | 2/2021 | Tiwari | G06F 8/65 |
| 2021/0173630 A1* | 6/2021 | Huang | G06F 8/65 |

* cited by examiner

*Primary Examiner* — Michael Simitoski
*Assistant Examiner* — Zhe Liu
(74) *Attorney, Agent, or Firm* — NIXON & VANDERHYE

(57) ABSTRACT

Disclosed is a method for separating a plate into multiple individual detached components or cutting the plate into chips. The back end process for a plate includes providing a substrate; attaching the plate to the substrate using a sacrificial layer that is made of materials that in a solid state at ambient temperature and ambient pressure, and having a transformation temperature into one or more gaseous compounds at ambient pressure of between 80° C. and 600° C.; and separating the plate attached on the substrate into a plurality of plate portions; increasing temperature and/or reducing surrounding pressure to transform the sacrificial layer into one or more gaseous compounds.

6 Claims, 2 Drawing Sheets

[Fig. 1]
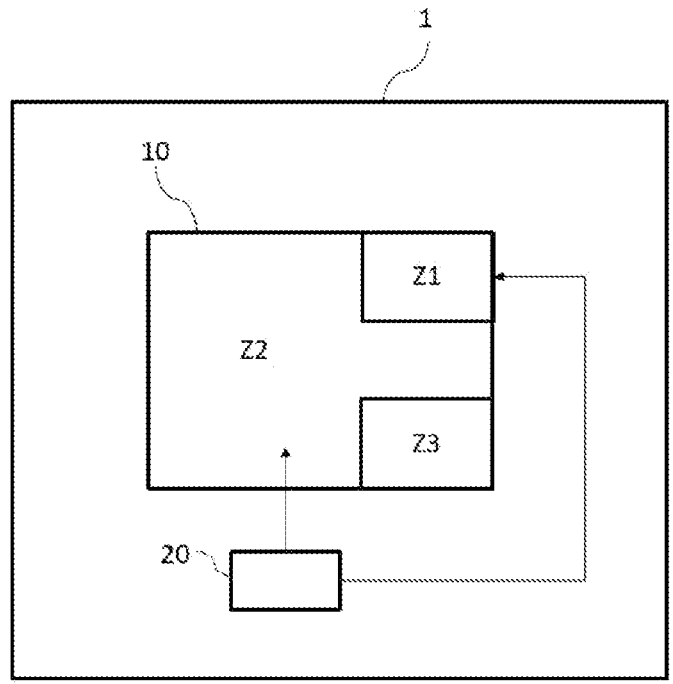
[Fig. 2]
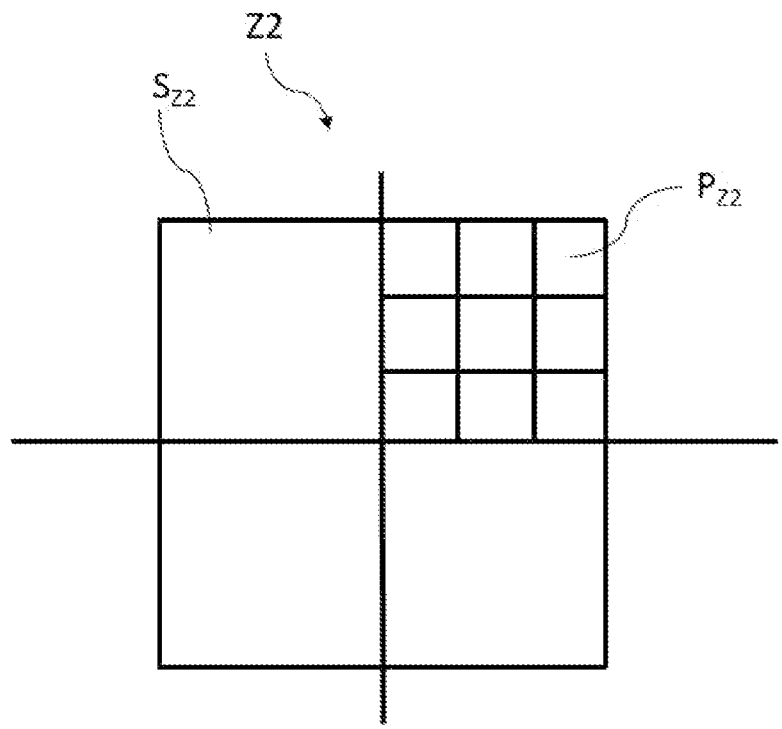

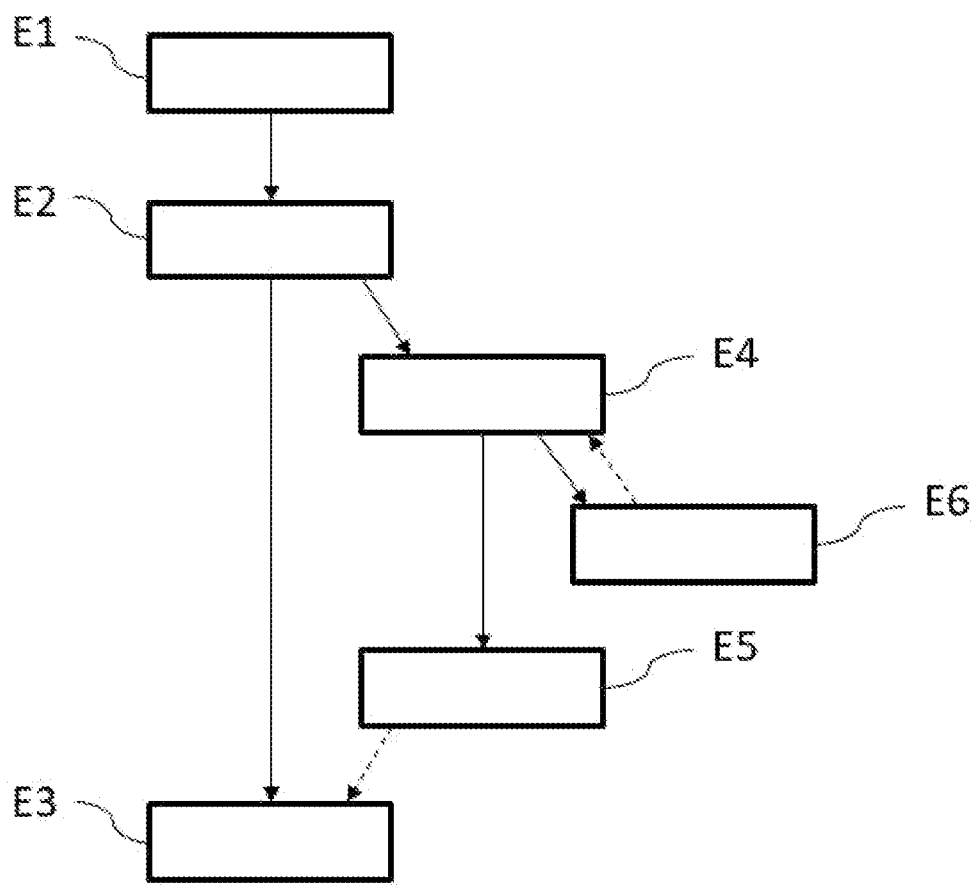
[Fig. 3]

METHOD FOR SECURING A MOTOR VEHICLE COMPUTER

BACKGROUND OF THE INVENTION

Field of the Invention

The invention relates to the field of electrical equipment on board a vehicle, in particular a motor vehicle, and relates more particularly to a method for securing a vehicle computer, and to a computer and vehicle allowing the implementation of the method.

In particular, the invention makes it possible to ensure that a memory is authentic.

Description of the Related Art

Nowadays, a vehicle, in particular a motor vehicle, comprises a plurality of computers which make it possible to perform functions of the vehicle, such as for example the injection function of the vehicle engine.

Each computer comprises a microcontroller, itself comprising a memory and at least one core. Said memory comprises a program, executed by the at least one core, allowing an application to be implemented in order to activate a function of the vehicle. Authentication of the memory has to be carried out to verify that the memory has not been modified illicitly in order to execute the software in complete security.

To achieve this, a first solution consists in using a functionality commonly known as a "secure boot" by those skilled in the art in which, after each computer startup, authentication of the memory is carried out by a core of the microcontroller. Only when authentication has been completed successfully will the core then be able to implement the application associated with memory of the computer. However, the core is capable of authenticating about one megabyte of data per second and thus, in practice, after computer startup, the core needs several seconds to authenticate the entire memory. However, it should be possible to implement the application less than 100 milliseconds after computer startup.

According to a second solution, commonly known as "authenticated boot" by those skilled in the art, the computer comprises a plurality of cores, one of which is used exclusively for authenticating the memory after computer startup, the other cores being used for implementing the application associated with the memory of the computer. The authentication of the memory and the application associated with the memory are implemented simultaneously. This second solution allows an inauthentic memory to be detected but does not prevent the execution of an application associated with an inauthentic memory. Indeed, said application is executed even before the associated memory is authenticated.

Therefore, there is a need for a solution that makes it possible to overcome these drawbacks at least in part.

SUMMARY OF THE INVENTION

The invention relates to a method for securing a motor vehicle computer, said computer comprising a microcontroller comprising a non-volatile memory and at least one core, said non-volatile memory comprising a "control" memory storage region comprising a set of startup instructions, an "application" memory storage region comprising at least one set of application instructions that is configured to implement an application of the computer by means of the at least one core, the microcontroller being switched off or on standby, the method being noteworthy in that it comprises the steps of:
  a. starting up the microcontroller,
  b. detecting, by implementing the set of startup instructions stored in the control memory region, the erasing of a portion of the application memory region of the non-volatile memory between the last switch-off or standby and the starting up of the microcontroller,
  c. in the absence of an erase, executing, by means of the microcontroller, at least one set of application instructions.

The terms "start up" or "starting up of the microcontroller" are understood to mean powering up the microcontroller or the microcontroller coming out of a state of standby.

Advantageously, the method allows authentication to be carried out only if needed. Specifically, on each startup, authentication is not systematically carried out and therefore, in the case where authentication is not carried out because it is deemed unnecessary, a time saving is made between the starting up or waking up of the computer and the implementation of the program held in the application memory region.

The non-volatile memory comprises a plurality of sectors in which one or more applications are stored in the form of binary bits, allowing one or more functions of the vehicle to be activated.

The smallest erase possible in the application memory region corresponds to the erasing of an entire sector, i.e. the bits of which "drop" to a value defined by default in said application memory region.

The default value depends on the type of the application memory region and may be equal to 0 or to 1.

Preferably, the method comprises, after the detecting step and in the case of an erase, a step of authenticating the application memory region.

Advantageously, this step of the method allows the application memory region to be authenticated only in the case where an erase of at least one sector of the application memory region has taken place.

Advantageously, the computer comprises a "detection" memory storage region. Each erase of a sector in said application memory region causes the transformation of a bit of the detection memory region.

The transformation of a bit means the transition of a bit from its default value to the opposite value.

Advantageously, this detection memory region makes it possible to indicate whether or not there has been an erase, and also to indicate the number of erases performed in the application memory region. Additionally, the transformation of bits in the detection memory region is caused inexorably and immutably.

Preferably, the method comprises, after the authenticating step and when it has been successful, a step of updating the control memory region, or in other words, recording, in the control memory region, the value of the number of bits that have been transformed in the detection memory region.

Preferably, in the detection step of the method, an erasing of a portion of the application memory region is detected when the number of bits that have been transformed in the detection memory region differs from the value recorded in the control memory region.

Advantageously, the recorded value acts as a reference in the detection step and makes it possible to determine, quickly and straightforwardly, whether an authentication step has to be carried out.

The invention also relates to a computer comprising a microcontroller comprising a non-volatile memory region and at least one core, said non-volatile memory comprising a "control" memory storage region comprising a set of startup instructions, an "application" memory storage region comprising at least one set of application instructions that is configured to implement an application of the computer by means of the at least one core, the microcontroller being switched off or on standby, being noteworthy in that it is configured to:

a. start up,
b. implement the set of startup instructions stored in the control memory region,
c. detect, by implementing the set of startup instructions, the erasing of a portion of the application memory region of the non-volatile memory between the last switch-off or standby and the starting up of the microcontroller,
d. in the absence of an erase, execute the at least one set of application instructions.

Advantageously, the computer allows authentication to be carried out only if needed. Specifically, on each startup, authentication is not systematically carried out and therefore, in the case where authentication is not carried out because it is unnecessary, a time saving is made between the starting up or waking up of the computer and the implementation of the program held in the application memory region.

Preferably, the non-volatile memory of the computer is a flash memory. In order words, it is a memory possessing the characteristics of a random-access memory but with its data retained in the memory even when without power, as known to those skilled in the art.

Preferably, the computer, when it detects an erase, is configured to authenticate the application memory region.

Advantageously, the computer allows the application memory region to be authenticated only in the case where an erase of at least one sector of the application memory region has taken place.

Advantageously, the computer comprises a "detection" memory storage region, each erase of a sector in said application memory region causing the transformation of a bit in the detection memory region.

Advantageously, the computer makes it possible to indicate whether or not there has been an erase, and also to indicate the number of erases performed in the application memory region.

Advantageously, the computer is configured to, after having authenticated the application memory region, update the control memory region, or in other words, to record, in the control memory region, the value of the number of bits that have been transformed in the detection memory region.

Preferably, the computer detects an erasing of a portion of the application memory region when the number of bits that have been transformed in the detection memory region differs from the value recorded in the control memory region.

Advantageously, the recorded value acts as a reference when the computer detects an erase and makes it possible to determine, quickly and straightforwardly, whether an authentication step has to be carried out.

The invention also relates to a vehicle comprising a computer such as presented above.

BRIEF DESCRIPTION OF THE DRAWINGS

Further features and advantages of the invention will become more clearly apparent from reading the following description. This description is purely illustrative and should be read with reference to the attached drawings, in which:

FIG. 1 schematically shows one embodiment of the computer according to the invention;
FIG. 2 illustrates one example of an application memory region used in the invention,
FIG. 3 shows the method according to the invention.

DESCRIPTION OF THE PREFERRED EMBODIMENTS

System

With reference to FIG. 1, one embodiment of the computer is shown comprising a microcontroller 1 comprising a non-volatile memory 10, in other words a memory in which the data are retained even in the absence of a power supply, and at least one core 20. FIG. 1 shows a microcontroller 1 comprising only one core 20 in order to simplify the description.

Memory 10

Said non-volatile memory 10 is in particular a "flash" memory, known to those skilled in the art, possessing the characteristics of a random-access memory but with its data retained in the memory even when without power.

Z1

The non-volatile memory 10 comprises a "control" memory storage region Z1 comprising a set of startup instructions, said startup instructions having to be carried out before computer startup. However, said control memory region Z1 may also be located in another non-volatile memory of the microcontroller 1.

The control memory region Z1 also comprises a counter, the function of which will be explained in the following paragraphs.

Z2

The non-volatile memory 10 also comprises an application memory storage region Z2 comprising at least one set of application instructions that is configured to implement an application of the computer, for example the injection function of the engine of the vehicle, by means of the at least one core 20.

With reference to FIG. 2, said application memory region Z2 is composed of at least one sector $S_{Z2}$ comprising a plurality of pages $P_{Z2}$, each page $P_{Z2}$ comprising a set of bits at 0 or 1 constituting an application implemented by the computer of the vehicle.

The smallest erase possible in the application memory region Z2 corresponds to the erasing of a sector $S_{Z2}$, and more precisely the transition of all of the bits in an entire sector $S_{Z2}$ to the default value.

The default value may be 0 or 1, and depends on the type of the application memory region Z2.

Thus, an "erased" sector $S_{Z2}$ comprises only bits that are equal to the default value. Additionally, in the case of a rewrite in a sector $S_{Z2}$ of the application memory region Z2, an erase is also implemented so as then to write in this sector $S_{Z2}$ which was previously erased. Obviously, a plurality of sectors $S_{Z2}$ may be modified simultaneously and/or independently.

Z3

Referring again to FIG. 1, the non-volatile memory 10 also comprises a "detection" memory storage region Z3. Said detection memory region Z3 may also be located in another non-volatile memory of the microcontroller 1.

The detection memory region Z3 is configured to have a bit that is transformed for each erase of a sector $S_{Z2}$ in the application memory region Z2. A transformed bit is here a bit that transitions from the default value to the opposite value, i.e. transitions from 0 to 1 or from 1 to 0. Furthermore, it is impossible to return the "transformed" bits to the default value. Each bit transformation is performed systematically and automatically either at the same time as the erase or between an erase request and the erase itself. The total number of transformed bits is registered in the counter of the control memory region Z3.

Core 20

At least one core 20 est configured to implement the set of startup instructions stored in the control memory region Z1 and the set of application instructions.

The microcontroller 1, being switched off or on standby, is configured to start up after powering up or waking up the computer and, by implementing the set of startup instructions, to detect whether there has been at least one erase in the application memory region Z2 of the non-volatile memory 10 between the last switch-off or standby and the starting up of the computer.

The microcontroller 1 is thus configured to initiate authentication of the application memory region Z2 if at least one erase has been detected, and/or to execute the at least one set of application instructions if no erase has been detected, and therefore if the application memory region Z2 is deemed to be authentic.

Method

With reference to FIG. 3, one embodiment of the method for securing a vehicle computer is shown, implemented by the embodiment of the computer as presented above.

The computer, and therefore the microcontroller 1, is first of all considered to be switched off or on standby.

The method first comprises a step E1 of starting up the computer. For example, in the case where the computer is on board a vehicle, on starting the vehicle or on unlocking the doors of the vehicle, directly or after a certain defined period of time, the computer starts up, or in other words is powered up or comes out of its state of standby. Additionally, the computer may also, by itself, restart or come out of its state of standby regularly during use of the vehicle, in particular in the event of the detection of an error in its operation or in the operation of the system to which it belongs.

After starting up the computer, the method comprises a step E2 of detecting an erase of a portion of the application memory region Z2 of the non-volatile memory 10 between the last switch-off or standby and the starting up of the computer. To do this, the core 20 of the microcontroller 1 implements the set of startup instructions stored in the control memory region Z1.

Thus, the number of bits that are transformed in the detection memory region Z3 is counted, and is compared with the number preregistered in the counter of the control memory region Z1.

As described above, an erase is more particularly the erasing of a sector $S_{Z2}$ of the application memory region Z2. Specifically, the smallest unit that can be erased corresponds to a sector $S_{Z2}$.

If the number of bits that are transformed in the detection memory region Z3 is equal to the number preregistered in the counter, this proves that there has been no erase between the last switch-off or standby and the starting up of the computer. In the absence of an erase, the application memory region Z2 remains authentic and the method comprises a step E3 of the core 20 of the microcontroller 1 executing at least one set of application instructions.

Additionally, if the number of bits that are transformed in the detection memory region Z3 is different from the number preregistered in the counter, this means that there has been at least one erase between the last switch-off or standby and the starting up of the computer.

In the case of an erase, this means that the application memory region Z2 is no longer authentic. Said erase may in particular be due to reprogramming of the application memory region Z2. Specifically, during licit reprogramming, by a mechanic for example, or illicit reprogramming, said application memory region Z2 was at least partially erased, causing the transformation of at least one bit, previously at the default value, in the detection memory region Z3.

Thus, for each sector $S_{Z2}$ erased, one bit in the detection memory region Z3 is transformed.

Because of the doubt dispelled previously via the detection of at least one erase, the method comprises a step E4 of authenticating the application memory region Z2.

If the authentication step is "successful", in other words if the program held in the application memory region Z2 is deemed to be authentic, the method comprises a step E5 of updating the value preregistered in the counter, in other words the value of the number of bits that are transformed of the detection memory region Z3 is recorded in the control memory region Z1.

Once the updating step E5 has been carried out, the method may comprise a step E3 of executing the at least one set of application instructions.

Otherwise, if authentication is not successful, for example because the application memory region Z2 is actually not authentic or because the computer was switched off prematurely during reprogramming, the program held in the application memory region Z2 is not deemed to be authentic and is not executed. In such a case, only a step E6 of reprogramming the application memory region Z2 is possible.

Optionally, at the end of the reprogramming step E6, the method may comprise a step E4 of authenticating the application memory region Z2 without even having to restart the computer.

Additionally, the number preregistered in the counter of the control memory region Z1 is determined beforehand, in each updating step E5 of the method.

Thus, the computer and the method implemented by said computer make it possible to avoid needlessly iterating the authentication step E4 and therefore needlessly wasting time between starting up the computer and implementing the program held in the application memory region Z2.

The invention claimed is:

1. A method for securing a motor vehicle computer including a microcontroller including a non-volatile memory and at least one core, said non-volatile memory including a control memory storage region including a set of startup instructions, an application memory storage region including at least one set of application instructions that is configured to implement an application of the computer by the at least one core, and a detection memory storage region, each erase in said application memory storage region causing a transformation of a bit of the detection memory storage region from a default value to an opposite value such that the detection memory storage region has a bit that is transformed for each erase in the application memory storage region, the default value depending on a type of the application memory storage region, the microcontroller being switched off or on standby, the method comprising:

starting up the microcontroller;

detecting, by implementing the set of startup instructions stored in the control memory storage region, the erasing of a portion of the application memory storage region of the non-volatile memory between the last switch-off or standby and the starting up of the microcontroller, the total number of transformed bits being registered in a counter of the control memory region, the number of bits that are transformed being counted and compared to a value recorded in the control memory storage region, the erasing of the portion of the application memory storage region being detected when a number of bits that have been transformed in the detection memory storage region from the default values that depend on the respective type of the application memory storage region differs from the value recorded in the control memory storage region;

in an absence of the erase, executing, by the microcontroller, at least one set of application instructions; and after the detecting the erasing of a portion of the application memory storage region and when the erase occurs,
    authenticating the erased application memory storage region, and
    updating the control memory storage region by recording, in the control memory storage region, the value of the number of bits that have been transformed in the detection memory storage region, after the authenticating and when the authenticating the erased application memory storage region is successful.

2. A computer comprising:
a microcontroller being switched off or on standby, the microcontroller comprising
    at least one core, and
    a non-volatile memory comprising
        a control memory storage region comprising a set of startup instructions,
an application memory storage region comprising at least one set of application instructions that is configured to implement an application of the computer by the at least one core, and a detection memory storage region, each erase in said application memory storage region causing a transformation of a bit of the detection memory storage region from a default value to an opposite value such that the detection memory storage region has a bit that is transformed for each erase in the application memory storage region, the default value depending on a type of the application memory storage region, wherein the computer is configured to:
start up,
implement the set of startup instructions stored in the control memory storage region,
detect, by implementing the set of startup instructions, the erase of a portion of the application memory storage region of the non-volatile memory between the last switch-off or standby and the starting up of the microcontroller, the total number of transformed bits being registered in a counter of the control memory region, the number of bits that are transformed being counted and compared to a value recorded in the control memory storage region, the erasing being detected when the number of bits that have been transformed differs from the value recorded in the control memory storage region, and
in an absence of the erase, execute the at least one set of application instructions.

3. The computer as claimed in claim 2, wherein the non-volatile memory is a flash memory.

4. The computer as claimed in claim 3, wherein the computer is configured to authenticate the application memory storage region when the erase has been detected.

5. The computer as claimed in claim 2, wherein the computer is configured to authenticate the application memory storage region when the erase has been detected.

6. A vehicle comprising:
the computer as claimed in claim 2.

* * * * *